US012706773B2

(12) United States Patent
Mages et al.

(10) Patent No.: US 12,706,773 B2
(45) Date of Patent: Aug. 11, 2026

(54) TRANSMITTING MODULE FOR A TRANSMITTING/RECEIVING DEVICE OF A SUBSCRIBER STATION OF A SERIAL BUS SYSTEM AND METHOD FOR TRANSMITTING A MESSAGE WITH DIFFERENTIAL SIGNALS IN A SERIAL BUS SYSTEM

(71) Applicant: Robert Bosch GmbH, Stuttgart (DE)

(72) Inventors: Christian Mages, Stuttgart (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 99 days.

(21) Appl. No.: 18/933,198

(22) Filed: Oct. 31, 2024

(65) Prior Publication Data

US 2025/0150301 A1 May 8, 2025

(30) Foreign Application Priority Data

Nov. 7, 2023 (DE) ..................... 10 2023 210 992.1

(51) Int. Cl.
*H04L 12/40* (2006.01)

(52) U.S. Cl.
CPC .............................. *H04L 12/40006* (2013.01)

(58) Field of Classification Search
CPC ....... H04L 25/0272; H04L 2012/40215; H04L 12/40032; H04L 12/40; H04L 12/40006; H04L 25/0292; H04L 12/40078; H04W 52/0229; H04W 4/18; H04W 4/48; H04W 12/00; H04W 4/60; H04W 8/245; H04W 12/43; H04W 12/0431; H04B 1/40; H04B 5/24; H04B 5/266; H04B 5/79;
(Continued)

(56) References Cited

U.S. PATENT DOCUMENTS

2014/0281078 A1* 9/2014 Biskup ..................... G06F 3/00 710/110
2017/0192929 A1* 7/2017 Biskup .................. G06F 13/364
2020/0141967 A1 5/2020 Oliaei et al.
(Continued)

OTHER PUBLICATIONS

ISO 11898-1:2015 Standard, "Road Vehicles—Controller Area Network (CAN)—Part 1: Data Link Layer and Physical Signalling," 2015, pp. 1-74.

*Primary Examiner* — Eva Y Puente
(74) *Attorney, Agent, or Firm* — NORTON ROSE FULBRIGHT US LLP

(57) ABSTRACT

A transmitting module for a transmitting/receiving device of a subscriber station of a serial bus system. The transmitting module transmits a digital transmit signal as an analog differential signal to a bus of the bus system to transmit a message to at least one other subscriber station. The transmitting module has transmission stages with parallel circuits including switchable resistors, and a control part for step-by-step control of the switching of the switchable resistors. At least two of the switchable resistors are arranged so as to be switchable together in a resistor block. At least two resistor blocks are provided which have at least one of the switchable resistors. The control part generates the bus states predetermined by the digital transmit signal over time on the bus by step-by-step changing the number of actively switched resistor blocks over time.

18 Claims, 8 Drawing Sheets

(58) Field of Classification Search
CPC . H04B 10/40; H04B 3/36; H04B 1/16; H04B 10/803; H04B 10/90
See application file for complete search history.

(56) References Cited

U.S. PATENT DOCUMENTS

| | | | | |
|---|---|---|---|---|
| 2021/0258185 | A1 | 8/2021 | Muth et al. | |
| 2022/0407748 | A1* | 12/2022 | Otsuka | H04L 25/0272 |
| 2023/0011275 | A1* | 1/2023 | Roeper | H03K 19/0963 |
| 2023/0216705 | A1 | 7/2023 | Van Dijk et al. | |
| 2025/0088385 | A1* | 3/2025 | Yang | H04L 12/40 |

* cited by examiner communication control device
subscriber station
TxD
RxD
1
10
11
12
121
122
20
21
22
221
222
30
40
41
42
45
46
47

450
451
452
453
454
455
456
457
458
459
SOF
t

Fig. 10

121A
121B
121C
121D
121
154
154P
153A
153B
153C
153D
153
1531
S <1 : X >
1522
1521
152
15
S_SL
S_SW
S_ST
S_RS
1512
151P
1511
151
TxD

121A1_1
43
44
161
162
163
164
S_A1
R_A1
S_A2
R_A2
S_A3
R_A3
S_A4
R_A4
S_A7
R_A7
S_A8
R_A8
S_A16
R_A16
A_1_1
A_1_2
A_1_3
A_1_4
153A_1
Q
D
C
3A1
3A2
3A3
3A4
A_1_0
N_A_1
S_1
1531

TRANSMITTING MODULE FOR A TRANSMITTING/RECEIVING DEVICE OF A SUBSCRIBER STATION OF A SERIAL BUS SYSTEM AND METHOD FOR TRANSMITTING A MESSAGE WITH DIFFERENTIAL SIGNALS IN A SERIAL BUS SYSTEM

CROSS REFERENCE

The present application claims the benefit under 35 U.S.C. § 119 of German Patent Application No. DE 10 2023 210 992.1 filed on Nov. 7, 2023, which is expressly incorporated herein by reference in its entirety.

FIELD

The present invention relates to a transmitting module for a transmitting/receiving device of a subscriber station of a serial bus system and to a method for transmitting a message with differential signals in a serial bus system.

BACKGROUND INFORMATION

Serial bus systems have a bus to which subscriber stations are connected via a transmitting/receiving device in order to communicate with each other via the bus. The transmitting/receiving device is also called a transceiver. During communication, data is exchanged between the subscriber stations, which can be, for example, sensors, control units in a vehicle or a technical production plant, etc. For data transfer in serial bus systems, there are different standards or data transfer protocols. Conventional serial bus systems with differential signals include, in particular, CAN XL, 10BASE-T1S Ethernet, FlexRay, LVDS (low voltage differential signaling) and so on.

Each of these serial bus systems uses differential signals with different signal states, which serially signal the data to be exchanged. The desired signal states can be generated with a transmitting module which is connected to the bus and is designed as a full bridge with a plurality of switchable resistors. Depending on the number of conductive resistors, a corresponding resistance is set at the output of the full bridge and a corresponding voltage can be generated on the bus. As a result, each desired signal state on the bus is determined by its open-circuit voltage and internal resistance. For the differential signals transmitted on the bus, a differential voltage is formed on the bus.

The problem is that the transition between two signal states can cause electromagnetic emissions which can interfere with other electrical devices. Therefore, there are specifications for maximum permissible electromagnetic emissions which must be met by each transmitting/receiving device (transceiver). However, these requirements for electromagnetic emissions are one of the greatest challenges in developing such a transmitting/receiving device (transceiver) with switched resistors in the full bridge.

The electromagnetic emissions are caused by fluctuations in the common mode signal on the bus. These are caused in two ways, first, by common mode fluctuations caused by the transmitting module (transmitter), and second, by the external circuitry of the transmitting/receiving device (transceiver).

The common mode fluctuations caused by the transmitting module (transmitter) can be caused by process variations, insufficient modeling of the components used, etc., causing the signal states to have different common modes, which cannot always be represented in simulations in the design phase.

The common mode fluctuations on the bus caused by the external circuitry of the transmitting/receiving device (transceiver) can be generated even if the transmitting/receiving device generates a "perfect" signal with a constant common mode. The reason for this is that the external circuit is not exactly symmetrical and part of the differential signal is converted to a common mode signal ("differential-to-common mode conversion"). Therefore, it is important to also optimize the spectrum of the differential signal. What is important here is the form of the transition from one state to another.

Mathematically, it can be shown that the spectrally optimal form for transitions of the differential signal between two signal states is the error function, which is the integral of the Gaussian bell function. Therefore, the transitions should be approximated as closely as possible to this function via discrete steps, namely as transition states between static states. This can be done by means of appropriate control logic.

However, there is a conflict of objectives in the control concepts between flexibility, efficiency (chip area and power consumption), maximum possible performance (optimal emission behavior) and development effort.

Another problem is that communication standards for vehicles place such high demands on robustness regarding the electric strength of the transmitting/receiving device (transceiver) that the transmitting/receiving device (transceiver) must be implemented in large process nodes. Such nodes or distributors are typically larger than 100 nm. As a result, the transmitting/receiving device (transceiver) is limited in its maximum possible digital clock frequency. As a result, in particular for a fast bus signal state transition, which is also referred to as an edge, only a few steps are available to approximate the transition form of the bus signal(s) to the error function.

For example, the CAN-XL specifications require slew rates of $t_{rise}<20$ ns (20-80%) for a bus signal. At a clock frequency of 500 MHZ (2 ns/clock), this only allows a maximum of 10 discrete steps to approximate a continuous signal transition in this range. This results in a significant peak in the frequency spectrum of the signal transition at the clock frequency of the digital part. The same applies to other serial bus systems with differential signals.

It is possible to generate the transitions of the differential bus signal between two signal states with analog time step generators, which asynchronously specify a fixed form of time steps t1, t2, . . . , tN for the transition by dimensioning capacitances and currents and which form the output of the circuit as individual step signals S_1, . . . , S_N. In this case, a plurality of chains are used to represent a plurality of static states. A minimum of three chains are required to generate the five signal states (REC, SIC, DOM, LV0, LV1) of CAN XL on the bus.

The disadvantage of such a time step generator, however, is that the three chains require a high level of circuitry and development effort and have a high power consumption during operation. In addition, although such a time step generator is very well suited to the requirements of CAN XL, the adaptation of transmitting/receiving devices to meet other communication standards is very complex.

SUMMARY

It is an object of the present invention to provide a transmitting module for a transmitting/receiving device of a subscriber station of a serial bus system and a method for transmitting a message with differential signals in a serial bus system which solve the aforementioned problems. In particular, a transmitting module for a transmitting/receiving device of a subscriber station of a serial bus system and a method for transmitting a message with differential signals in a serial bus system are to be provided, which allow reliable and as error-free and low-emission as possible creation/generation of bus signals for any differential bus system as easily and cost-effectively as possible.

The object may be achieved by a transmitting module for a transmitting/receiving device of a subscriber station of a serial bus system, according to the present invention. According to an example embodiment of the present invention, in the bus system, the transmitting module is designed to transmit a digital transmit signal as an analog differential signal to a bus of the bus system in order to transmit a message to at least one other subscriber station of the bus system. In this case, the transmitting module has transmission stages with parallel circuits consisting of switchable resistors, and a control part for step-by-step control of the switching of the switchable resistors, wherein at least two of the switchable resistors are arranged so as to be switchable together in a resistor block, wherein at least two resistor blocks are provided which have at least one of the switchable resistors, wherein the control part is designed to generate the intermediate states predetermined by the digital transmit signal over time on the bus by step-by-step changing the number of actively switched resistor blocks over time.

The transmitting module of the present invention described herein requires relatively little circuitry and development effort for the configuration of the switchable resistor arrays described. The slew rate for the transition to be generated between two signal states can be adjusted.

As a result, the transmitting module of the present invention described herein requires significantly less space than an implementation with a plurality of delay chains. This allows semiconductor space to be saved, making the described transmitting module extremely resource-saving and cost-effective.

As a further consequence, the power consumption during operation of the transmitting module described is also very low, in particular compared to a solution with a plurality of delay chains.

Due to the adjustability of the slew rate, the transmitting module described can be easily adapted to meet different communication standards for differential bus systems. In particular, the transmitting module can be used with a CAN SIC transmitting/receiving device and/or with a CAN XL transmitting/receiving device and/or with a 10BASE-T1S transmitting/receiving device and/or with another transmitting/receiving device for differential signals.

Another advantage is that with the described transmitting module of the present invention, control can be carried out very easily between the states. This allows the transmitting/receiving device to cover a wide range of possibilities in a timely and continuous manner in order to ensure that the final state is switched to at the correct time without abrupt transitions.

Yet another advantage is that the transmitting module ensures that even in the event of unforeseen incomplete transitions, no abrupt changes to the output of the transmitting module are possible. The reason for this is that even after resetting the circuit, the changes only happen step by step. This ensures a continuous output at the output of the transmitting module, which has a positive effect on the emission behavior of the transmitting module and the higher level transmitting/receiving device.

In this way, the described transmitting module of the present invention ensures that the bus does not have abrupt transitions in differential voltage on the bus and/or impedance. As a result, the transmitting/receiving device generates little to no emissions or reflections in the bus system.

Overall, the transmitting/receiving device described can not only realize communication in the bus system between other subscriber stations with the (high) bit rates required for the respective communication standard, but is also designed in such a way that the transmittable bit rate is not reduced by errors in the communication.

Advantageous further embodiments of the transmitting module of the present invention are disclosed herein.

All switchable resistors can have approximately the same resistance value.

It is possible that the resistance value of a first resistor block of the at least two resistor blocks is approximately half as large as the resistance value of a second resistor block of the at least two resistor blocks.

In a special embodiment of the present invention, the transmit module also has a state processing block for evaluating the digital transmit signal in order to decide how the switchable resistors of the parallel circuits are to be switched step by step in order to set the desired state on the bus.

The state processing block can be configured to generate a slew rate signal, wherein the state processing block is configured to generate the slew rate signal based on an evaluation result of the digital transmit signal.

The state processing block can be configured to generate a step start signal, wherein the state processing block is configured to output the slew rate signal after being enabled by the step start signal to control the switchable resistors.

According to one example embodiment of the present invention, the transmitting module further comprises a step generator for generating a step signal based on a slew rate signal and for outputting the step signal to a logic block for controlling switches of the parallel circuit for switching the switchable resistors.

The state processing block can be designed to generate a reset signal for resetting the step generator to an initial value.

According to one example embodiment of the present invention, the transmitting module also has a logic block for generating a control signal for controlling the at least two resistor blocks of a transmission stage.

Optionally, the logic block has at least two flip-flops arranged to generate a control signal for each of the at least two resistor blocks, wherein the logic block is designed to generate the control signal as a binary number with bits whose number is equal to the number of the at least two flip-flops and to output the bits to the at least two flip-flops.

According to one example embodiment of the present invention, the transmitting module also has a memory block in which setpoints are stored for the resistance values of the parallel circuits which are to be generated for transitions between signal states on the bus for each intermediate state in the transition, wherein the state processing block is designed to generate, on the basis of the evaluation of the digital transmit signal, a selection signal and to output the selection signal to the logic block, and wherein the logic block is designed to generate the control signal for controlling the at least two resistor blocks of a transmission stage on the basis of the transitions selected by the selection signal.

Possibly, the transmitting module for generating each intermediate state on the bus has a resistor cell in which resistor blocks are arranged, wherein the logic block for controlling each intermediate state on the bus comprises a control cell which is designed to control one of the resistor cells, and wherein all control cells are constructed identically for each intermediate state.

In a special embodiment of the present invention, a first to fourth transmission stage are connected in a full bridge, in which the first and fourth transmission stages are connected in series and the third and second transmission stages are connected in series. In this case, the first to fourth transmission stages for generating differential bus signals for a bus of the bus system in response to the two different values of the digital transmit signal can be designed such that the transmitting module generates, in its first operating mode, a first or second bus state on the bus and generates, in its second operating mode, a third or fourth bus state, wherein the bus signals on the bus form a differential voltage of which the voltage value is different for the first to fourth bus states.

The above-described transmit module can be part of a transmitting/receiving device which also has a receiving module for receiving signals from the bus and for generating a digital received signal from the analog differential signal.

The transmitting module is possibly designed to generate the analog differential signals in a first communication phase of the message with a different physical layer than in a second communication phase.

The transmitting/receiving device described above can be part of a subscriber station for a serial bus system. The subscriber station can also be a communication control device for controlling the communication in the bus system and for generating the first transmit signal. The subscriber station can be designed for communication in the bus system, in which an exclusive, collision-free access of a subscriber station to the bus of the bus system is guaranteed at least temporarily.

The aforementioned object may also achieved by a method for transmitting a message with differential signals in a serial bus system having features of the present invention. The method is carried out with a transmitting module which has transmission stages with parallel circuits consisting of switchable resistors and is designed to transmit a digital transmit signal as an analog differential signal to a bus of the bus system in order to transmit a message to at least one other subscriber station of the bus system. According to an example embodiment of the present invention, the method comprises the steps of controlling, step by step, the switching of switchable resistors with a control part of the transmitting module, wherein at least two of the switchable resistors are arranged so as to be switchable together in a resistor block, wherein at least two resistor blocks are provided which have at least one of the switchable resistors, and generating, and wherein the control part generates the bus states predetermined by the digital transmit signal over time on the bus by step-by-step changing the number of actively switched resistor blocks over time.

The method of the present invention offers the same advantages as mentioned above with respect to the transmitting module of the present invention.

Further possible implementations of the present invention also include combinations, even those not explicitly mentioned, of features or embodiments described above or below with respect to the exemplary embodiments. In this case, a person skilled in the art will also add individual aspects as improvements or additions to the relevant basic form of the present invention.

BRIEF DESCRIPTION OF THE DRAWINGS

The present invention is described in more detail below with reference to the figures and on the basis of (an) exemplary embodiment(s) of the present invention.

FIG. 10 shows a block diagram of a control part of the transmitting module of FIG. 9.

In the figures, identical or functionally identical elements are given the same reference signs unless otherwise indicated.

DETAILED DESCRIPTION OF EXAMPLE EMBODIMENTS

Figures 1, 2:
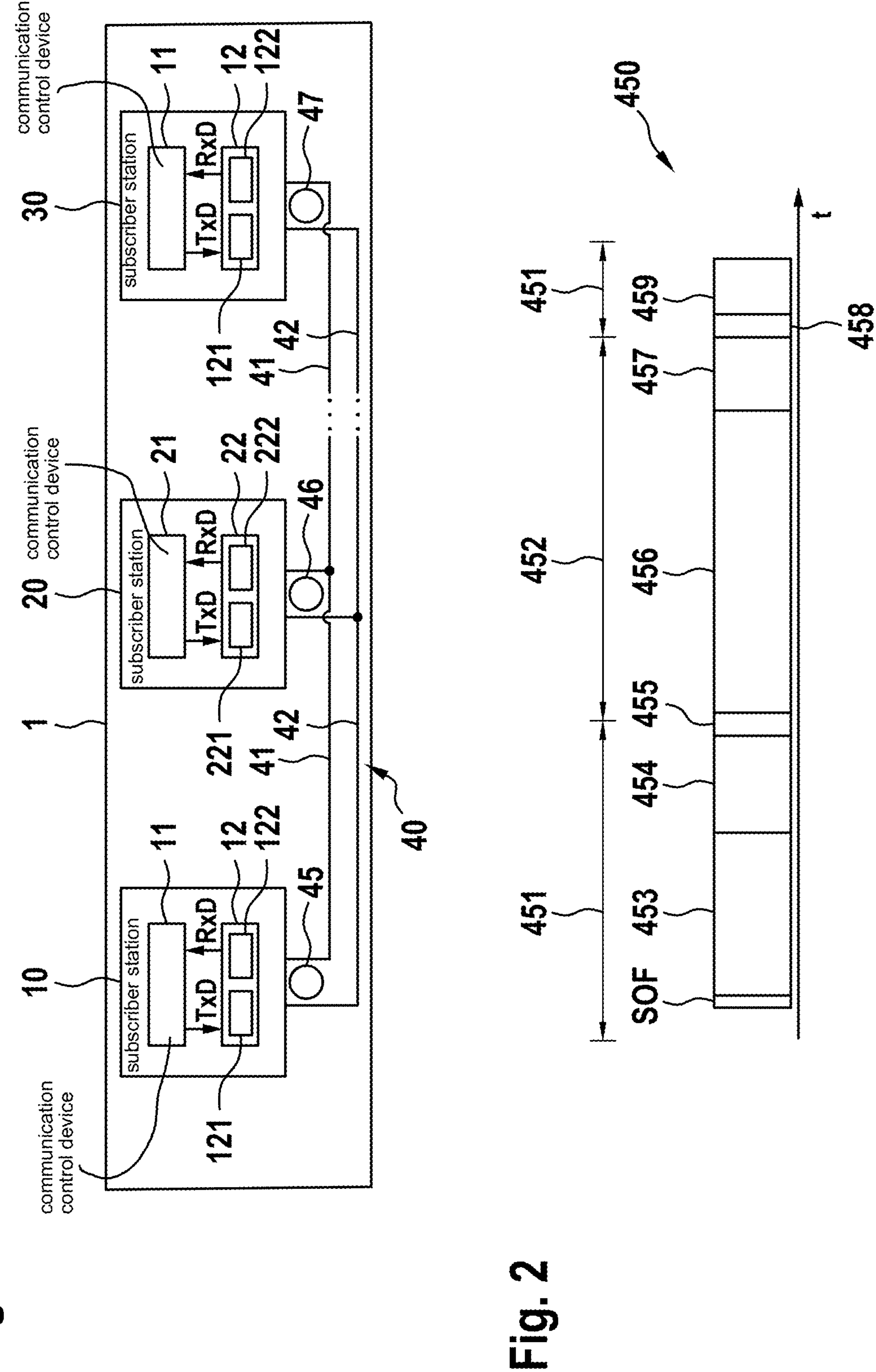
FIG. 1 shows a simplified block diagram of a bus system according to a first exemplary embodiment of the present invention.
FIG. 2 shows a diagram for illustrating the structure of a message which can be transmitted by a subscriber station of the bus system according to the first exemplary embodiment of the present invention.

FIG. 1 shows a bus system 1, which can, for example, at least in sections, be a CAN bus system, a CAN FD bus system, etc. The bus system 1 can be used in a vehicle, in particular a motor vehicle, an aircraft, etc., or in a hospital, etc.

Even though the bus system 1 is described below using CAN bus systems, the bus system 1 is not limited to CAN bus systems. Alternatively, the bus system 1 can be in particular a 10BASE-T1S bus system or another serial bus system 1 which in particular uses differential signals.

In FIG. 1, the bus system 1 has a plurality of subscriber stations 10, 20, 30, which are each connected to a bus 40 or bus line having a first bus wire 41 and a second bus wire 42. In a CAN bus system, the bus wires 41, 42 can also be called CANH and CANL for carrying signals CAN_H, CAN_L on the bus 40. In a 10BASE-T1S bus system, the bus wires 41, 42 are called LINE+ and LINE−.

Messages 45, 46, 47 in the form of signals are transferred between the individual subscriber stations 10, 20, 30 via the bus 40. The subscriber stations 10, 20, 30 are, for example, control devices or display devices of a motor vehicle.

As shown in FIG. 1, the subscriber stations 10, 30 each have a communication control device 11 and a transmitting/receiving device 12. The transmitting/receiving device 12 has a transmitting module 121 and a receiving module 122.

The subscriber station 20 has a communication control device 21 and a transmitting/receiving device 22. The transmitting/receiving device 22 has a transmitting module 221 and a receiving module 222.

The transmitting/receiving devices 12 of the subscriber stations 10, 30 and the transmitting/receiving device 22 of the subscriber station 20 are each directly connected to the bus 40, even though this is not shown in FIG. 1.

The communication control devices 11, 21 are each used for controlling communication of the corresponding subscriber station 10, 20, 30 via the bus 40 with at least one other subscriber station of the subscriber stations 10, 20, 30 which are connected to the bus 40.

The communication control device 11 creates and reads first messages 45, 47, which are, for example, modified CAN messages 45, 47. Here the modified CAN messages 45, 47 are based on the CAN XL format, for example. The transmitting/receiving device 12 serves for transmitting and receiving the messages 45, 47 from the bus 40. The transmitting module 121 receives a digital transmit signal TxD generated by the communication control device 11 for one of the messages 45, 47 and converts said transmit signal into signals on the bus 40. The digital transmit signal TxD can be a pulse-width-modulated signal, at least temporarily or in sections. The receiving module 122 receives signals transmitted on the bus 40, corresponding to the messages 45 to 47, and generates a digital receive signal RxD therefrom. The receiving module 122 transmits the receive signal RxD to the communication control device 11.

In addition, the communication control device 11 can be designed to create and read second messages 46, which are, for example, CAN SiC messages 46. The transmitting/receiving device 12 can be designed accordingly.

The communication control device 21 can be designed as a conventional CAN controller according to ISO 11898-1:2015, i.e. as a CAN FD-tolerant Classical CAN controller or as a CAN FD controller. The communication control device 21 creates and reads second messages 46, for example CAN FD messages or CAN SiC messages. The transmitting/receiving device 22 is used to transmit and receive the messages 46 to/from the bus 40. The transmitting module 221 receives a digital transmit signal TxD generated by the communication control device 21 and converts said transmit signal into signals for a message 46 on the bus 40. The receiving module 222 receives signals transmitted on the bus 40, corresponding to the messages 45 to 47, and generates a digital receive signal RxD therefrom. The transmitting/receiving device 22 may be designed like a conventional CAN FD transceiver or CAN SiC transceiver.

To transmit messages 45, 46, 47 with CAN SiC or CAN XL, proven properties are adopted that are responsible for the robustness and user-friendliness of CAN and CAN FD, in particular the frame structure with identifier and arbitration according to the conventional CSMA/CR method. The CSMA/CR method has the consequence that there must be so-called recessive states on the bus 40, which can be overwritten by other subscriber stations 10, 20, 30 with dominant levels or dominant states on the bus 40.

With the two subscriber stations 10, 30, a formation and then a transmission of messages 45, 47 with different CAN formats, in particular the CAN FD format or the CAN SiC format or the CAN XL format, as well as the reception of such messages 45, 47, can be realized. This is described in more detail below for a message 45.

FIG. 2 shows, for the message 45, a frame 450, which is in particular a CAN XL frame, said frame being provided by the communication control device 11 for the transmitting/receiving device 12 for transmission onto the bus 40. In this case, the communication control device 11 creates the frame 450 as compatible with CAN FD in the present exemplary embodiment. Alternatively, the frame 450 is compatible with any successor standard for CAN FD.

According to FIG. 2, the frame 450 is divided, for CAN communication on the bus 40, into different communication phases 451, 452, namely an arbitration phase 451 (first communication phase) and a data phase 452 (second communication phase). After a start bit SOF, the frame 450 has an arbitration field 453, a control field 454, a first switching field 455, a data field 456, a checksum field 457, a second switching field 458 and a frame termination field 459. The checksum field 457, the second switching field 458 and the frame termination field 459 form a frame end phase 457, 458, 459 of the frame 450.

In the arbitration phase 451, with the aid of an identifier (ID) in the arbitration field 453, negotiation takes place bitwise between the subscriber stations 10, 20, 30 as to which subscriber station 10, 20, 30 wishes to transmit the message 45, 46 with the highest priority and will therefore receive exclusive access to the bus 40 of the bus system 1 for the next time for transmitting in the subsequent data phase 452. A physical layer such as in CAN and CAN FD is used in the arbitration phase 451. The physical layer corresponds to the bit transmission layer or layer 1 of the conventional OSI model (Open Systems Interconnection Model).

During the phase 451, the conventional CSMA/CR method is used, which allows simultaneous access of the subscriber stations 10, 20, 30 to the bus 40 without the higher priority message 45, 46 being destroyed. As a result, further bus subscriber stations 10, 20, 30 can be added relatively easily to the bus system 1, which is very advantageous.

The CSMA/CR method has the consequence that there must be so-called recessive states on the bus 40, which can be overwritten by other subscriber stations 10, 20, 30 with dominant levels or dominant states on the bus 40. In the recessive state, high-impedance conditions prevail at the individual subscriber station 10, 20, 30, which in combination with the parasites on the bus circuit results in longer time constants. This leads to a limitation of the maximum bit rate of the present-day CAN-FD physical layer at currently about 2 megabits per second in real vehicle use.

At the end of the arbitration phase 451, the first switching field 455 is used to switch to the data phase 452.

In the data phase 452, in addition to a portion of the first switching field 455, the payload data of the CAN XL frame 450 or of the message 45 from the data field 456 are transmitted, and so is the checksum field 457 and a portion of the second switching field 458. At the end of the data phase 452, the second switching field 458 is used to switch back to the arbitration phase 451.

A transmitter of the message 45 begins to transmit bits of the data phase 452 to the bus 40 only when the subscriber station 10 as the transmitter has won the arbitration and the subscriber station 10 as the transmitter thus has exclusive access to the bus 40 of the bus system 1 for transmitting.

Thus, in the arbitration phase 451 as the first communication phase, the subscriber stations 10, 30 use, in part, in particular up to the FDF bit (inclusive), a format from CAN/CAN FD, according to ISO 11898-1:2015. However, in comparison to CAN or CAN FD, an increase in the net data transfer rate, in particular to over 10 megabits per second, is possible in the data phase 452 as the second communication phase. In addition, an increase in the size of the payload data per frame, in particular to about 2 kilobytes or any other value, is possible.

Figure 3:
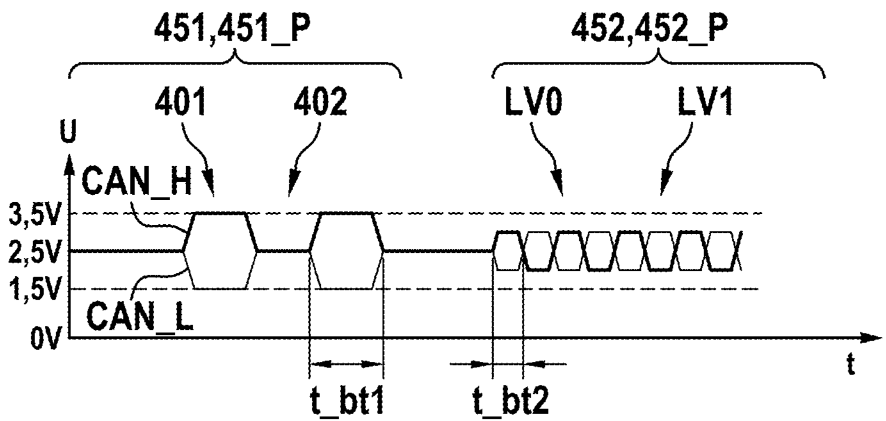
FIG. 3 shows an example of the ideal time curve of bus signals CAN_H, CAN_L, which are sent to a bus of the bus system by subscriber stations of the bus system for the message in FIG. 2.

As shown in FIG. 3, in the arbitration phase 451, the transmitting/receiving devices 12 use a first physical layer 451_P to transmit to the bus 40 a transmit signal TxD (FIG. 1) over time t as signals CAN_H, CAN_L. The same applies to the transmitting/receiving device 22. In contrast, in the data phase 452 the transmitting/receiving device 12 may use a second physical layer 452_P which is different from the first physical layer 451_P in order to transmit to the bus 40 the transmit signal TxD (FIG. 1) as signals CAN_H, CAN_L, as described above. There are two operating modes for the physical layer 452_P, namely FAST_TX and FAST RX, as described in more detail below.

FIG. 3 shows on the left side that in the arbitration phase 451 the subscriber stations 10, 20, 30 each transmit signals CAN_H, CAN_L over time t to the bus 40, which have a first bit duration t_bt1. The signals CAN_H, CAN_L are serial signals and alternately have at least one dominant state 401, in which VCAN_H=3.5 V and VCAN_L=1.5 V, or at least one recessive state 402, in which VCAN_H=VCAN_L=2.5. A dominant state 401 (dom) is driven in phase 451 during NRZ encoding of the transmit signal TxD when TxD=0 or LW (LOW). A recessive state 402 (rec) is generated or occurs during NRZ encoding of the transmit signal TxD in phase 451 when TxD=1 or HI (HIGH). After the arbitration in the arbitration phase 451, one of the subscriber stations 10, 20, 30 is determined as the winner.

If the particular subscriber station 10, 20, 30 detects the signaling in the first switching field 455 of FIG. 2 for switching from the first to the second communication phase 451, 452, the associated transmitting/receiving device 12 switches its physical layer 451_P at the end of the arbitration phase 451 from a first operating mode (SLOW), which can alternatively be implemented as a SiC operating mode, to the physical layer 452_P of the data phase 452. For this purpose, the operating modes of the data phase 452 are switched on as follows.

Assuming that the first subscriber station 10 has won the arbitration, Then, in particular due to a signaling in the first switching field 455 of FIG. 2, the transmitting/receiving device 12 of the subscriber station 10 switches its physical layer 451_P at the end of the arbitration phase 451 from the first operating mode (SLOW) to the physical layer 452_P of the data phase 452 for a second operating mode (FAST_TX) of the transmitting/receiving device 12 because the subscriber station 10 is the sender of the message 45 in the data phase 452. As shown in FIG. 3, in the data phase 452 or in the second operating mode (FAST_TX) the transmitting module 121 then, depending on a transmit signal TxD, generates the states LV0 or LV1 with the physical layer 452_P for the signals CAN_H, CAN_L on the bus 40, one after the other and thus serially. The state LV0 (VCAN_H=3.0 V, VCAN_L=2.0 V) is driven during a pulse width modulation (PWM coding) of the transmit signal TxD for a first PWM symbol in the transmit signal TxD. The state LV1 (VCAN_H=2.0 V and VCAN_L=3.0 V) is driven during the pulse width modulation (PWM coding) of the transmit signal TxD for a second PWM symbol which is different from the first PWM symbol in the transmit signal TxD.

The frequency of the signals CAN_H, CAN_L can be increased in the data phase 452. In the example in FIG. 3, the bit time or bit duration t_bt2 in the data phase 452 is shorter or less than the bit time or bit duration t_bt1 in the arbitration phase 451. In the example in FIG. 3, the net data transfer rate in the data phase 452 is thus increased compared to the arbitration phase 451.

In contrast, for example, the transmitting/receiving device 12 of the subscriber station 30 switches its physical layer 451_P at the end of the arbitration phase 451 from the first operating mode (SLOW or SiC) to the physical layer 452_P of the data phase 452 for a third operating mode (FAST_RX) of the transmitting/receiving device 12 because in the data phase 452 the subscriber station 30 is only a receiver, i.e. not a transmitter, of the frame 450.

If the transmitting/receiving device 12, in particular with the signaling in the second switching field 458 of FIG. 2, detects that a switchover from the data phase 452 back to the arbitration phase 451 is to be made, the transmitting/receiving device 12 will be switched from transmitting (operating mode FAST_TX) (and) or receiving (operating mode FAST_RX) signals with the physical layer 452_P to transmitting and/or receiving signals with the physical layer 451_P. Thus, after the end of the data phase 452 all transmitting/receiving devices 12 switch their operating mode to the first operating mode (SLOW or Sic). All transmitting/receiving devices 12 can thus not only switch between the bit durations t_bt1, t_bt2 but also switch their physical layer, as described above.

The curve of the corresponding signals in the transmitting/receiving device 12 during the switchover from phase 451 to phase 452, during the data phase 452 and during the switchover from phase 452 back to phase 451 is explained in more detail below with reference to FIG. 10 to FIG. 15.

Figure 4:
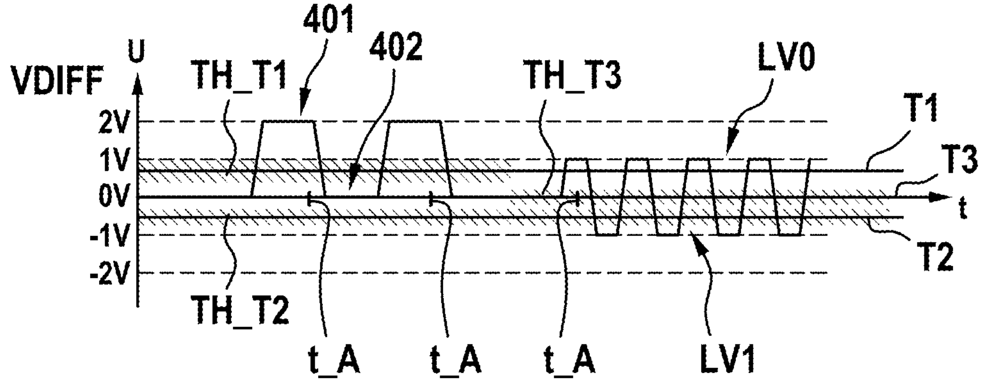
FIG. 4 shows the time curve of a differential voltage VDIFF which is equal to the bus voltage VBUS, in particular equal to VCAN, and forms on the bus of the bus system as a result of the bus signals of FIG. 3.

According to FIG. 4, in the arbitration phase 451 over time t in the ideal case a difference signal VDIFF=CAN_H−CAN_L with values of VDIFF=2V for dominant states 401 (dom) and VDIFF=0V for recessive states 402 (rec) is formed on the bus 40. The curve of VDIFF in phase 451 is shown on the left side in FIG. 4. In contrast, in the data phase 452, a difference signal VDIFF=CAN_H−CAN_L corresponding to the states LV0, LV1 in FIG. 4 is formed over time t on the bus 40, as shown on the right-hand side in FIG. 4. The state LV0 has a value VDIFF=1V. The state LV1 has a value VDIFF=−1 V.

The receiving module 122 can distinguish the states 401, 402 with in each case two of the receiving thresholds T1, T2, T3, which lie in the ranges TH_T1, TH_T2, TH_T3. For this purpose, the receiving module 122 samples the signals in FIG. 3 or FIG. 4 at times t_A, as shown in FIG. 4. To evaluate the sampling result, in the arbitration phase 451 the receiving module 122 uses the receiving threshold T1 of, for example, 0.7 V and the receiving threshold T2 of, for example, −0.35 V. In contrast, in the data phase 452 the receiving module 122 only uses signals that were evaluated with the receiving threshold T3. When switching between the first to third operating modes (SLOW or SiC, FAST_TX, FAST_RX) described above with reference to FIG. 3, the receiving module 122 switches in each case the receiving thresholds T2, T3.

The receiving threshold T2 is used to detect whether the bus 40 is free when the subscriber station 12 is newly connected to communication on the bus 40 and attempts to integrate itself into communication on the bus 40.

Upon receiving the corresponding signals from the bus 40, each transmitting/receiving device 12 generates the associated reception signal RxD, as shown in FIG. 1. Ideally, the reception signal RxD has no time offset from the transmission signal TxD.

Figure 5:
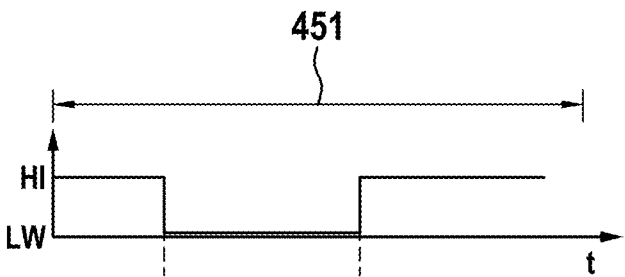
FIG. 5 shows an example of a time curve of a digital transmit signal which is to be converted in an arbitration phase (SIC operating mode) into bus signals CAN_H, CAN_L for a bus of the bus system of FIG. 1.

FIG. 5 shows an example of a part of the digital transmit signal TxD which the transmitting module 121 receives in the arbitration phase 451 from the communication control device 11 and from which said transmitting module generates the signals CAN_H, CAN_L for the bus 40. In FIG. 5, the transmit signal TxD switches from a state LW (low) to a state HI (high) and back to the state LW (low).

Figure 6:
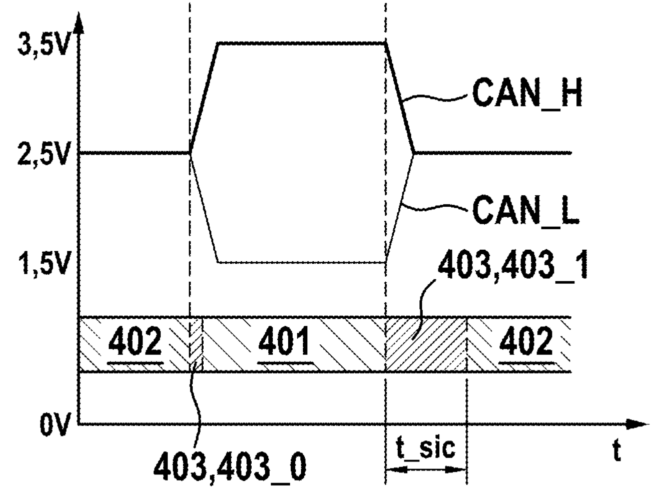
FIG. 6 shows the time curve of the bus signals CAN_H, CAN_L during switching from a recessive bus state to a dominant bus state and back to the recessive bus state, which bus signals are transmitted onto the bus in the arbitration phase (SIC operating mode) due to the transmit signal of FIG. 5.

As shown in more detail in FIG. 6, for the transmit signal TxD of FIG. 5, the transmitting module 121 generates the signals CAN_H, CAN_L for the bus wires 41, 42 in such a way that a state 403 (sic) is additionally present. The state 403 (SIC) can have different lengths, as shown with the state 403_0 (SIC) during the transition from the state 402 (rec) to the state 401 (dom) and with the state 403_1 (sic) during the transition from the state 401 (dom) to the state 402 (rec). The state 403_0 (sic) is shorter in time than the state 403_1 (sic). To generate signals according to FIG. 6, the transmitting module 121 is switched to a SIC operating mode (SIC mode).

Passing through the short sic state 403_0 is not required in CiA610-3 and the state depends on the type of implementation. The duration of the "long" state 403_1 (sic) is specified for CAN SIC as well as for the SIC operating mode in CAN XL as t_sic<530 ns, starting with the rising edge of the transmit signal TxD of FIG. 5.

In the "long" state 403_1 (SIC), the transmitting module 121 should adapt the impedance between the bus wires 41 (CANH) and 42 (CANL) as well as possible to the characteristic impedance Zw of the bus line used. Here, Zw equals 100 ohms or 120 ohms. This adaptation prevents reflections and thus allows operation at higher bit rates. For the sake of simplicity, hereinafter reference will always be made to the state 403 (sic) or sic state 403.

The transmitting module 121 can be used to generate signals for the bus 40 for the following CAN types: CAN FD, CAN SIC and CAN XL.

TABLE 1

CAN types for transmitting module 121

| CAN type | Communication phases/bit rate | Bus states | Transmitting module states |
|---|---|---|---|
| CAN FD | Arbitration | dom, rec | dom, rec |
| CAN SIC | Arbitration | dom, sic, rec | dom, sic, rec |
| CAN XL | Arbitration or arbitration and data field for the case in which no switch to the fast operating mode occurs | dom, sic, rec | dom, sic, rec |
| CAN XL | Data phase | LV0, LV1 | LV0, LV1 |

Thus, the transmitting module state 403 (sic) can be generated not only with CAN SIC or CAN XL (xl_sic). The transmitting module state 403 (sic) can also be generated with CAN FD. However, in CAN FD, the time for the transmitting module state 403 (sic) can be shorter than with CAN SIC or CAN XL.

The transmitting module 121 can thus generate two different bus states for CAN FD, three different bus states for CAN SIC and five different states for CAN XL.

Figure 7:
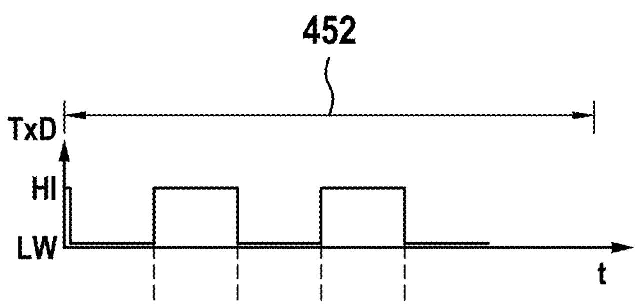
FIG. 7 shows an example of a time curve of a digital transmit signal which is to be converted in a data phase into bus signals CAN_H, CAN_L for the bus of the bus system of FIG. 1.

FIG. 7 shows an example of another part of the digital transmit signal TxD which the transmitting module 121 receives in the data phase 452 from the communication control device 11 and from which said transmitting module generates the signals CAN_H, CAN_L for the bus 40. In FIG. 7, the transmit signal TxD switches several times from a state HI (high) to a state LW (low) and back to a state HI (high) and so on.

Figure 8:
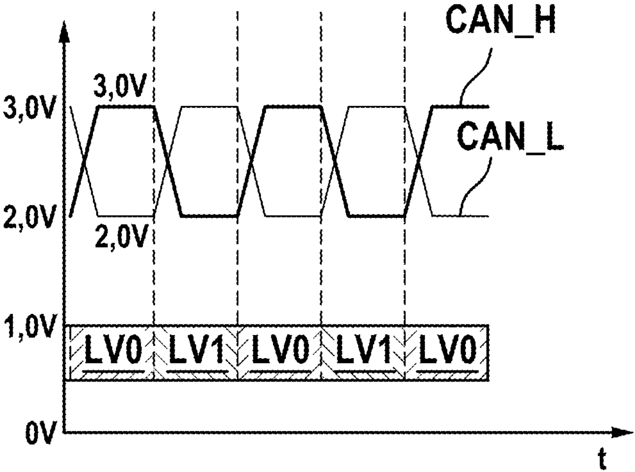
FIG. 8 shows the time curve of the bus signals CAN_H, CAN_L which are transmitted onto the bus in the data phase due to the transmit signal of FIG. 7.

As shown in more detail in FIG. 8, for the transmit signal TxD of FIG. 7, the transmitting module 121 generates the signals CAN_H, CAN_L for the bus wires 41, 42 in such a way that the state LV0 is formed for a state LW (low). In addition, the state LV1 is formed for a state HI (high).

Figure 9:
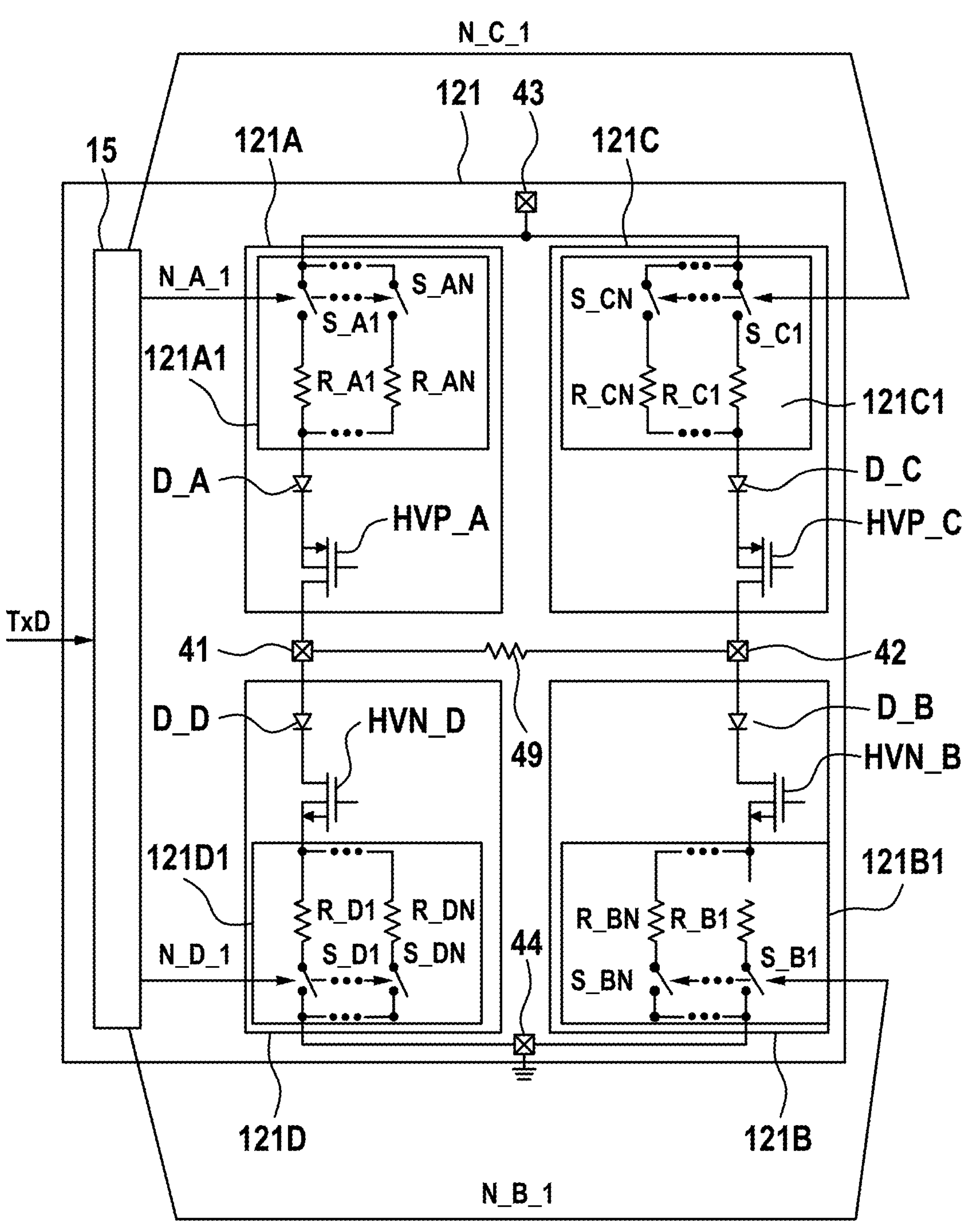
FIG. 9 shows a circuit diagram of a transmitting module for a transmitting/receiving device which can be used for a subscriber station of the bus system according to the first exemplary embodiment.

FIG. 9 shows the transmitting module 121 for the transmitting/receiving device 12 in more detail, which can be used for one of the subscriber stations 10, 30. The transmitting module 221 for the transmitting/receiving device 22 can be constructed in the same way as the transmitting module 121 for the transmitting/receiving device 12. For this reason, the transmitting module 221 is not described separately.

The transmitting module 121 is connected to the bus 40, more precisely to its first bus wire 41 for CAN_H or CAN-XL_H or LINE+ and to its second bus wire 42 for CAN_L or CAN-XL_L or LINE−. Each of the transmission stages 121A to 121D is connected to the bus 40.

The transmitting module 121 of FIG. 9 can, for example, generate the signals CAN_H, CAN_L according to FIG. 6 with the states 401, 402, 403 and signals CAN_H, CAN_L according to FIG. 8 with the states LV0, LV1.

The transmitting module 121 has a first to fourth transmission stage 121A, 121B, 121C, 121D and a control part 15. As shown in FIG. 9, the transmission stages 121A to 121D are connected as a full bridge. The control part 15 is used to control the transmission stages 121A, 121B, 121C, 121D according to the transmit signal TxD and the set operating mode SIC, FAST_TX of the transmitting module 121. For this purpose, the control part 15 generates at least one signal N_A_1 for controlling the first transmission stage 121A, at least one signal N_B_1 for controlling the second transmission stage 121B, at least one signal N_C_1 for controlling the third transmission stage 121C and at least one signal N_D_1 for controlling the fourth transmission stage 121D. This is described in more detail with reference to FIG. 10 to FIG. 12.

The voltage supply for supplying the first and second bus wires 41, 42 with electrical energy, in particular with the voltage CAN-Supply of typically 5 V, is effected via at least one terminal 43. The connection to ground, in particular CAN_GND, is realized via a terminal 44. The first and second bus wires 41, 42 are terminated with a terminating resistor 49. The terminating resistor 49 is connected in the full bridge as an external load resistor. The resistor 49 is connected in the bridge branch between the terminals for the bus wires 41, 42.

The first transmission stage 121A of FIG. 9 has a polarity reversal diode D_A, a transistor HVP_A, and a parallel circuit 121A1 in which a series circuit consisting of a first switch S_A1 and a first resistor R_A1 is connected in parallel to at least one series circuit consisting of an N-th switch S_AN and an N-th resistor R_AN for a first to N-th current stage, as shown in more detail in FIG. 11 and described below, where N is a natural number>1. With respect to the transmission stage 121A, the number N is also referred to below as N_A. The transistor HVP_A is a CMOS transistor, in particular a PMOS transistor, the control of which is not shown in detail in FIG. 9 to simplify the drawing. The abbreviation "CMOS" refers to a semiconductor device that uses both p-channel and n-channel MOSFETs on a common substrate. The abbreviation CMOS stands for "complementary metal-oxide-semiconductor". The abbreviation "MOSFET" stands for "metal oxide semiconductor field-effect transistor".

The second transmission stage 121B of FIG. 9 has a polarity reversal diode D_B, a transistor HVN_B, and a parallel circuit 121B1 in which a series circuit consisting of a first switch S_B1 and a first resistor R_B1 is connected in parallel to at least one series circuit consisting of an N-th switch S_BN and an N-th resistor R_BN for a first to N-th current stage, where N is the natural number>1. With respect to the transmission stage 121B, the number N is also referred to below as N_B. The transistor HVN_B is a CMOS transistor, in particular an NMOS transistor, the control of which is not shown in detail in FIG. 9 to simplify the drawing.

The third transmission stage 121C of FIG. 9 has a polarity reversal diode D_C, a transistor HVP_C, and a parallel circuit 121C1 in which a series circuit consisting of a first switch S_C1 and a first resistor R_C1 is connected in parallel to at least one series circuit consisting of an N-th switch S_CN and an N-th resistor R_CN for a first to N-th current stage, where N is the natural number>1. With respect to the transmission stage 121C, the number N is also referred to below as N_C. The transistor HVP_C is a CMOS transistor, in particular a PMOS transistor, the control of which is not shown in detail in FIG. 9 to simplify the drawing.

The fourth transmission stage 121D of FIG. 9 has a polarity reversal diode D_D, a transistor HVN_D, and a parallel circuit 121D1 in which a series circuit consisting of a first switch S_D1 and a first resistor R_D1 is connected in parallel to at least one series circuit consisting of an N-th switch S_DN and an N-th resistor R_DN for a first to N-th current stage, where N is the natural number>1. With reference to the transmission stage 121D, the number N is also referred to below as N_D. The transistor HVN_D is a CMOS transistor, in particular an NMOS transistor, the control of which is not shown in detail in FIG. 9 to simplify the drawing.

Each series circuit consisting of the parallel circuits 121A1, 121B1, 121C1, 121D1 implements a current stage S1 to SN of the transmission stages 121A to 121D. For this purpose, the current stages S1 to SN of the transmission stages 121A to 121D are designed as resistance stages, which can also be referred to as resistance fingers. The resistance stages are set by selecting the resistance value of the corresponding current stage, for example by selecting the resistors R_A1 to R_AN for the transmission stage 121A, etc. As a result of adjusting the resistance values of the resistors, the currents and thus current stages generated by the corresponding transmission stage 121A to 121D are set. The number N can be chosen arbitrarily. In particular, the number N and thus the number of stages or number of resistance stages or current stages can be selected between 1 and 60. Alternatively, however, a number larger than 60 can be chosen for N.

Each of the polarity reversal diodes D_A, D_B, D_C, D_D protects the associated transmission stage against positive feedback to the terminal 44 (CAN-Supply) and negative feedback to the terminal 43 (CAN_GND). Each of the polarity reversal diodes D_A, D_B, D_C, D_D can also be called a blocking diode.

Each of the parallel circuits 121A1, 121B1, 121C1, 121D1, more precisely with control by the control part 15, sets a resistance value for the associated transmission stage 121A, 121B, 121C, 121D according to the operating mode (SLOW or SIC, FAST_TX) of the transmitting module 121 and the transmit signal TxD. The resistance value of the individual transmission stage 121A, 121B, 121C, 121D can thus be set depending on the operating mode (SLOW or SIC, FAST_TX) of the transmitting module 121 and the transmit signal TxD. This is described in more detail below using FIG. 10 and FIG. 12 as well as Table 2 and Table 3. Each of the transistors HVP_A, HVN_B, HVP_C, HVN_D is an HV cascode and can also be called an HV standoff device. The transistor HVP_A protects the parallel circuit 121A1 by absorbing high voltage drops. Each of the transistors HVN_B, HVP_C, HVN_D has the same function for the corresponding parallel circuit 121B1, 121C1, 121D1. Each of the transistors HVP_A, HVN_B, HVP_C, HVN_D can be controlled accordingly at its control terminal, in particular by the control part 15 or another control device (not shown).

In the transmitting module 121, the transmission stage 121A is connected between the terminal 43 for the voltage supply and the terminal 41 (CANH) for the signal CAN_H. The transmission stage 121C is connected between the terminal 43 for the voltage supply and the terminal 42 (CANL) for the signal CAN_L and the terminal 43 for ground or the terminal 44 (CAN_GND). The transmission stage 121D is connected between the terminal 41 (CANH) for the signal CAN_H and the terminal 43 for ground or the terminal 44 (CAN_GND). The transmission stage 121B is connected between the terminal 42 (CANL) for the signal CAN_L and the terminal 43 for ground or the terminal 44 (CAN_GND). Thus, in the transmitting module 121, firstly the transmission stage 121A is connected into the CANH path. Secondly the transmission stage 121D is connected into the CANH path. Firstly the transmission stage 121C is connected into the CANL path. Secondly the transmission stage 121B is connected into the CANL path.

The signals CAN_H, CAN_L form the differential signal transmitted from the transmitting module 121 to the bus 40.

Thus, the transmitting module 121 consists, in the CANH path and in the CANL path, of a parallel circuit 121A1, 121B1, 121C1, 121D1 of a predetermined number of current stages or resistance fingers, as described above. The parallel connection of all current stages is connected, in the CANH path and in the CANL path, in series with an HV cascode HVP_A, HVN_B, HVP_C, HVN_D and a polarity reversal diode D_A, D_B, D_C, D_D, as described above. The HV cascodes HVP_A, HVN_B, HVP_C, HVN_D make it possible to comply with limit values (maximum rating parameters), such as voltage at CANH and CANL of −27 V to +40 V.

Figure 10:
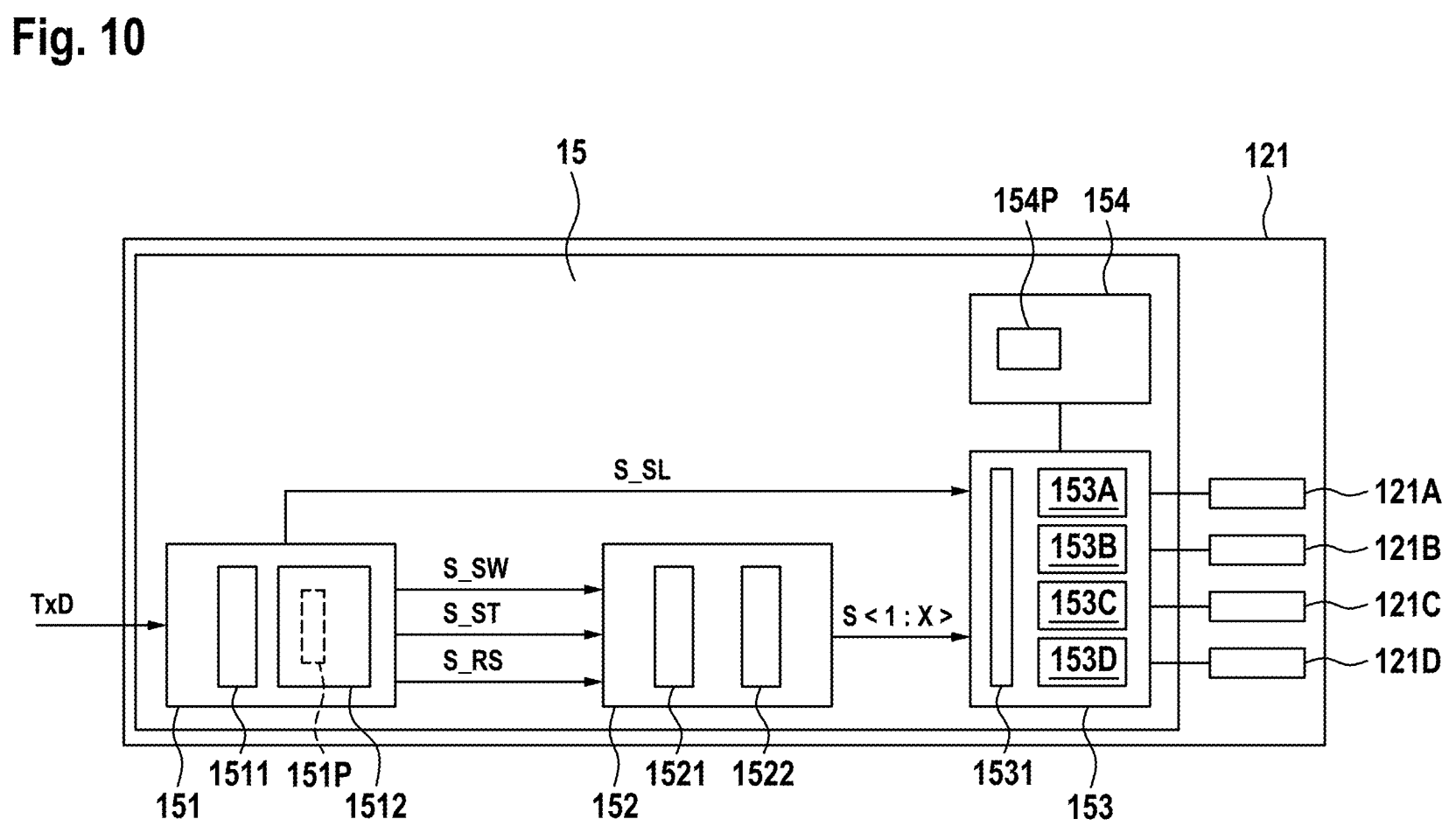
Figure 11:
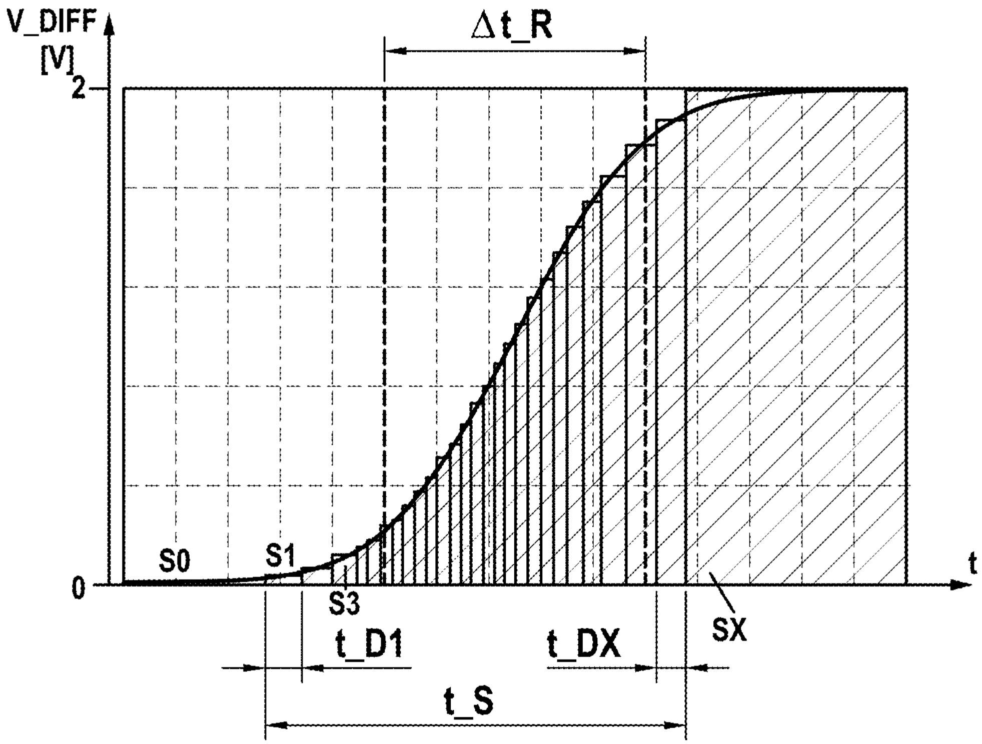
FIG. 11 shows a time curve of a signal state transition which can be generated with the transmitting module of FIG. 9.
Figure 12:
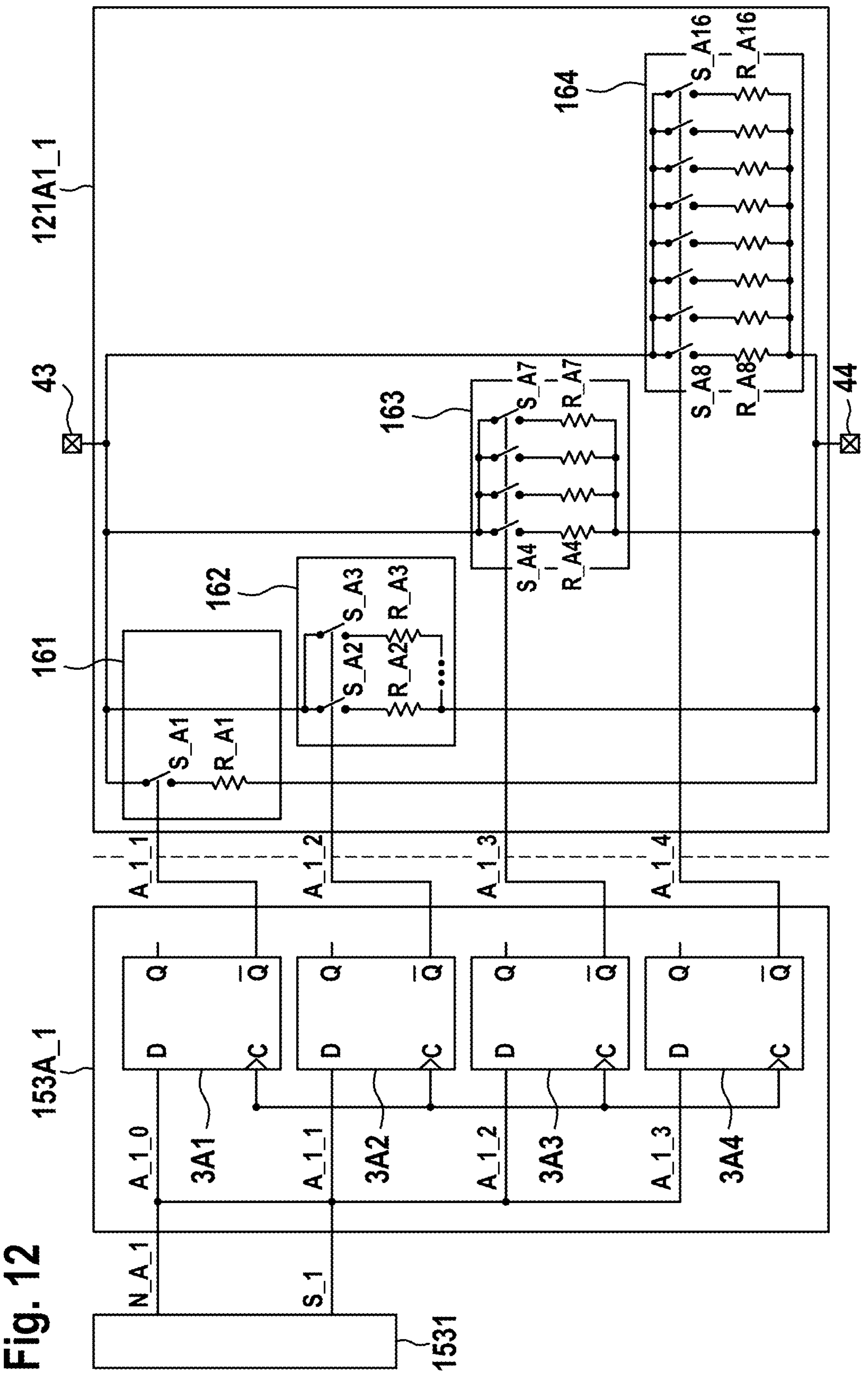
FIG. 12 shows an electrical circuit diagram of a part of a logic block of the control part of FIG. 10 and of a resistor array for a transmission stage of the transmitting module of FIG. 9.

The basic operation of the circuit of FIG. 9 according to the operating mode of the transmitting module 121 and the bus state 401 (dom), 403 (sic), 402 (rec) in the SIC operating mode (arbitration phase 451) and LV0, LV1 in the data phase 452 is explained using FIG. 10 to FIG. 12 and the following Tables 2, 3.

FIG. 10 shows the control part 15 of the transmitting module 121 for the transmitting/receiving device 12 in more detail, which control part can be used for the subscriber stations 10, 30 of the bus system 1. The transmitting/receiving device 22 for the subscriber station 20 can be constructed in the same way as described below for the transmitting/receiving device 12.

The control part 15 has a state processing block 151, a step generator 152, a logic block 153 and a memory block 154. The transmit signal TxD is input into the control unit 15. The control part 15 forms a control signal for the transmission stages 121A to 121D therefrom. The state processing block 151, the step generator 152, and the logic block 153 form a control chain or chain for the step-by-step generation of the transmission currents of the transmitting module 121, which are required for a low-emission transition between two bus signal states or bus states 401, 402, 403, LV0, LV1.

In FIG. 10, the state processing block 151 has an evaluation unit 1511 and a signal generation unit 1512. The evaluation unit 1511 evaluates the transmit signal TxD with respect to the current signal state of the digital transmit signal TxD and the operating mode which is switched for the transmitting module 121. The evaluation result of the evaluation unit 1511 for a received transmit signal TxD according to FIG. 5 or FIG. 7 can therefore be HI (high) or LW (low). The operating mode (SIC, FAST_TX) to which the transmitting module 121 is switched then determines which of the bus signal states or bus states 401, 402, 403, LV0, LV1 is to be generated. In addition, the evaluation unit 1511 can evaluate whether the signal state of the digital transmit signal TxD has changed compared to the previous signal state of the digital transmit signal TxD and/or whether the operating mode of the transmitting module 121 has changed.

The signal generation unit 1512 is designed to generate signals S_SL, S_SW, S_ST when the evaluation result of the evaluation unit 1512 shows that switching between two of the bus states 401, 402, 403, LV0, LV1 is to be carried out and thus a transition between two of the bus states 401, 402, 403, LV0, LV1 is to be generated. Accordingly, the signal generation unit 1512 generates a selection signal S_SL, a slew rate signal S_SW and a step start signal S_ST according to the evaluation of the evaluation unit 1511. The signals S_SL, S_SW, S_ST are different depending on the type of transition, for example from state 401 (dom) to state 403 (sic). Optionally, at least one of the signals S_SL, S_SW, S_ST is generated using parameters 151P. The parameters 151P can be stored in the signal generation unit 1512 or are available by accessing the memory block 154.

The signal generation unit 1512 outputs the selection signal S_SL to the logic block 153. In contrast, the signal generating unit 1512 outputs the slew rate signal S_SW, the step start signal S_ST and the reset signal S_RS to the step generator 152.

When the control of a transition between the two bus signal states is complete, for example for a transition from state 401 (dom) to state 403 (sic), the signal generation unit 1512 generates a reset signal S_RS.

The step generator 152 has an evaluation unit 1521 and a signal generation unit 1522. The evaluation unit 1521 evaluates the slew rate signal S_SW and the step start signal S_ST. The signal generation unit 1522 generates a step signal S<1:X> on the basis of this evaluation and outputs it to the logic block 153, as described in more detail below. X is any natural number greater than 1. The step signal s<1:X> is designed to change, step by step, the resistance values and thus the transmission currents of the transmission stages 121A, 121B, 121C, 121D of the transmitting module 121.

The logic block 153 can be designed as a programmable logic. The logic block 153 controls the transmission stages 121A, 121B, 121C, 121D of the transmitting module 121, in particular using control units 153A, 153B, 153C, 153D and parameters 154P. The parameters 154P are stored in the memory block 154. The control unit 153A is designed to control the transmission stage 121A, in particular its parallel circuit 121A1. The control unit 153B is designed to control the transmission stage 121B, in particular its parallel circuit 121B1. The control unit 153C is designed to control the transmission stage 121C, in particular its parallel circuit 121C1. The control unit 153D is designed to control the transmission stage 121D, in particular its parallel circuit 121D1.

Setpoints, in particular in the form of parameters 154P, for the parallel circuits 121A1, 121B1, 121C1, 121D1 of FIG. 9 are stored in the memory block 154 for all permitted transitions between signal states on the bus 40 for each step in the transition. In a CAN bus system, the transitions are, for example, the transition from state 401 (dom) to state 403 (sic), the transition from state 403 (sic) to state 401 (dom), the transition from state LV0 to state LV1 and the transition from state LV1 to state LV0 and so on.

The logic block 153 is designed to carry out a control which sets the setpoints for the parallel circuits 121A1, 121B1, 121C1, 121D1 of FIG. 9. The setpoints stored in the parameters 154P for the parallel circuits 121A1, 121B1, 121C1, 121D1 of FIG. 9 can be set as desired so that, in particular, the emissions of the transmitting module 121 are low so that the electromagnetic compatibility (EMC) requirements of the transmitting module 121 are met.

The following tables 2, 3 show an example of setpoints which can be stored in the memory block 154. In the example of Tables 2, 3, the logic block 153 controls the parallel circuits 121A1, 121B1, 121C1, 121D1 of FIG. 9 such that the parallel circuits 121A1, 121B1, 121C1, 121D1 of FIG. 9 successively assume 30 different resistance values R_A, R_B, R_C, R_D. As a result, for each of the 30 steps S1 to S30, different differential resistances R_DIFF or impedances of the transmission stages 121A/121B and 121C/121D and different differential voltages VDIFF are set on the bus 40, as indicated in Table 2. This completes the transition from 401 to 403 in 30 steps S1 to S30. Table 3 indicates the number N_A of actively switched resistance fingers for the transmission stage 121A, the number N_B of actively switched resistance fingers for the transmission stage 121B, the number N_C of actively switched resistance fingers for the transmission stage 121C, and the number N_D of actively switched resistance fingers for the transmission stage 121D of 5 the transmitting module 121.

The steps S1 to S30 are also referred to below as intermediate states on the bus 40.

TABLE 2

Example of electrical setpoints for transition 401 to 403 in 30 steps S1 to S30 or S1, . . . S30 according to the number of resistance fingers in Table 3

| State | Step/ intermediate state | V_DIFF (V) | R_DIFF (Ohm) | R_A (Ohm) | R_B (Ohm) | R_C (Ohm) | R_D (Ohm) |
|---|---|---|---|---|---|---|---|
| 401 (dom) | S0 | 2 | 40 | 20 | 20 | infinite | infinite |
| intermediate state | S1 | 1.96 | 41 | 21 | 21 | 7k | 7k |
| intermediate state | S2 | 1.9 | 43 | 22 | 22 | 2.3k | 2.3k |
| intermediate state | . . . | . . . | . . . | . . . | . . . | . . . | . . . |
| intermediate state | S29 | 0.03 | 99 | 96 | 96 | 101 | 101 |
| 403 (sic) | S30 | 0 | 100 | 100 | 100 | 100 | 100 |

TABLE 3

Example number of resistance fingers in parallel circuits 121A1, 121B1, 121C1, 121D1 of FIG. 9 for transition 401 to 403 in 30 steps S1 to S30 or S1, . . . S30 for CAN XL for single resistance fingers where R_finger = 10 kOhm, polarity reversal diode

| State | Step/intermediate state | N_A | N_B | N_C | N_D |
|---|---|---|---|---|---|
| 401 (dom) | S0 | 500 | 500 | 0 | 0 |
| intermediate state | S1 | 485 | 485 | 1 | 1 |
| intermediate state | S2 | 461 | 461 | 4 | 4 |
| intermediate state | . . . | . . . | . . . | . . . | . . . |
| intermediate state | S29 | 104 | 104 | 98 | 98 |
| 403 (sic) | S30 | 100 | 100 | 100 | 100 |

protection voltages of 0.7V, power supply voltage Vcc=5V at terminal 43 and an impedance Z_Bus=50 Ohm for the resistor 49.

During operation of the transmitting module 121, the state processing block 151 uses the transmit signal TxD at the input to decide when to carry out which transition, in particular with the evaluation unit 1511.

In order to initiate a transition, in particular from the bus state 401 (dom) to the bus state 403 (sic), the corresponding combinatorial circuit for the number N_A, N_B, N_C and N_D of the resistors R_A1 etc. in the parallel circuits 121A1, 121B1, 121C1, 121D1 is first selected by the selection signal S_SL in the logic block 153. In addition, in particular at the same time, the desired signal slew rate for the bus signal (CAN_H; CAN_L) is set for the upcoming transition according to the specification of the slew rate signal S_SW and the chain, in particular the step generator 152, is reset to an initial value via the reset signal S_RS.

The circuit of FIG. 10 thus forms a delay chain which runs successively through the steps S1 to SX in one direction. This simplifies the switching of a transition. In addition, the current consumption is reduced compared to a circuit which has more than one delay chain, in particular with 3 delay chains or 3 times 2 delay chains, as described above with respect to the related art.

The state processing block 151 is designed to generate the step start signal S_ST such that the step generator 152 is started only after a predetermined delay time in order to complete the transition between the bus states. Thus, the delay chain is started or initiated only after a predetermined delay time in order to complete the transition between the two consecutive bus states. For example, the predetermined delay time is about 1 ns, in particular a time between 1 ns and 5 ns. The predetermined delay time ensures that both the step generator 152 and the logic block 153 are ready to make the desired transition between bus states.

The step generator 152, in particular its signal generation unit 1522, thus generates the control signals or step signals for the steps S1, . . . , SX, which signals change their state one after the other at time intervals t_D1, . . . , t_DX, in particular to HI (high).

FIG. 11 shows an example of a curve of the bus voltage U in relation to the maximum voltage Um of the transition controlled by the control part 15 of FIG. 10 for the transmission stage 121 between the states 401 (dom) and 403 (sic). In the example shown in FIG. 11, the control part 15 controls the transition over time t in steps S1, . . . , SX and time intervals t_D1, . . . , t_DX. For the sake of clarity, not all steps S1 to SX, which correspond to intermediate states on the bus 40, and time intervals t_D1, . . . , t_DX are labeled in FIG. 11.

The example of FIG. 11 shows an asynchronous time step generation for generating the transition between the bus signal states 401 (dom), 403 (sic). Such a time step generation by means of the control part 15 asynchronously specifies a fixed form of time steps S1, . . . , SX for the transition, which as individual signals for each of the intermediate states or steps S1, . . . , SX form the output of the step generator 152 and the control part 15. This also results in a predetermined rise time Δt_R of the edge between the two states on bus 40.

The ratio of the length of a time step t_Dn to the total switching time t_S=t_D1+ . . . +t_DX is constant. In the middle (the steepest part of the curve) the time steps are short and at the beginning and end they are longer. The total length t_S of the transition can be adjusted by setting a bias current to adjust the slew rate of the transition.

The course of the transition between two states of states 401, 402, 403, LV0, LV1 can be set freely. By using longer time steps t_D1, . . . t_DX at the beginning and end of the transition or sequence than in the middle, a spectrally optimal "smooth" overall transition from one state to the other can be approximated.

The advantage of the above-described asynchronous step chain for the transmitting module 121 compared to a synchronous step chain controlled by a regular clock signal is primarily that the described step chain of the transmitting module 121 has significantly better emission behavior.

The reason for this is that the high frequency spectral components of the signals on bus 40 are distributed more evenly over the frequency range rather than being concentrated at integer multiples of the clock frequency. For the same number of steps per transition or step sequence, the maximum of the spectrum is significantly lower over the high frequency range of 100 MHZ-3 GHZ.

The speed of the step chain then defines the time in which this transition between the states takes place. The speed of the transitions 401, 402, 403, LV0, LV1 is limited only by the maximum switching speed of the resistance fingers used in the transmission stages 121A, 121B, 121C, 121D.

To produce a transition as shown in FIG. 11 on bus 40, each of the four resistor arrays or parallel circuits 121A1, 121B1, 121C1, 121D1 in the H-bridge of FIG. 9 has individual resistor cells, each of which has a control cell provided in the logic block 153, as described with reference to FIG. 12.

For the parallel circuit 121A1 for the intermediate state or time step S1, FIG. 12 shows an example of one of the resistor cells 121A1_1 and a corresponding control cell 153A_1 for the time step S1. For each time step S1, . . . , SX, there is one resistor cell 121A1_1 and one corresponding control cell 153A_1 per parallel circuit 121A1, 121B1, 121C1, 121D1, as shown in FIG. 12. All control cells 153A_1 for steps S2 to SX are identically constructed.

Accordingly, the transmitting module 121 has a total of 30 resistor cells 121A1_1 per individual transmission stage 121A1, 121B1, 121C1, 121D1. Thus, each parallel circuit 121A1, 121B1, 121C1, 121D1 has a total of 30 resistor cells 121A1_1. In the present example for controlling 30 time steps, therefore, the transmitting module 121 has 4 times 30=120 resistor cells 121A1_1 and 4 times 30=120 control cells 153A_1.

According to FIG. 12, the resistor cell 121A1_1 has binary weighted switchable resistor elements S_A1, R_A1, etc. which are connected in resistor blocks 161, 162, 163, 164. The resistance values of the resistor elements S_A1, R_A1, etc. and/or the resistor blocks 161, 162, 163, 164 can be selected for the individual resistor cell 121A1_1 as required. The resistance values of the resistor elements S_A1, R_A1 etc. and of the resistor blocks 161, 162, 163, 164 can be identical or at least partially different for the resistor cells 121A1_1 of the individual transmission stages 121A1, 121B1, 121C1, 121D1.

Each of the parallel circuits 121A1, 121B1, 121C1, 121D1 thus has binary weighted switchable resistor elements which are suitably switched for the applicable step S1 to SX (FIG. 11) according to the step signal S<1:X> of FIG. 10. In the example of FIG. 12, the resistor cell 121A1_1 is switchable with 4 bits.

FIG. 12 shows the design of the resistor cell 121A1_1 of the parallel circuit 121A1 for the example that 16 resistance fingers or resistor elements are connected in four resistor blocks 161, 162, 163, 164 which have switches S_A1 to S16 and resistors R_A1 to R_A16. Therefore, N=16. The parallel circuits 121B1, 121C1, 121D1 are designed in the same way in this example and are therefore not described separately.

For example, the resistors R_A1 to R_A16 all have the same resistance value. The resistance value 8 kOhm is assumed as an example below for each of the resistors R_A1 to R_A16. The switches S_A1 to S16 can in particular be CMOS transistors, in particular PMOS transistors. The same applies to switches S_A1 to S16 of the parallel circuit 121C1. The switches S_A1 to S16 of the parallel circuits 121B1, 121D1 can in particular be CMOS transistors, in particular NMOS transistors.

The first resistor block 161 has a resistor in a series circuit formed by the first switch S_A1 and the first resistor R_A1. When the first switch S_A1 is switched to be conductive, the resistor block 161 in the resistor cell 121A1_1 acts with a total resistance value of 8 kOhm in the example given.

The second resistor block 162 has two resistors R_A2, R_A3 in two series circuits connected in parallel. Thus, block 162 has a series circuit consisting of a second switch S_A2 and a second resistor R_A2 and a series circuit consisting of a third switch S_A3 and a third resistor R_A3. When the second and third switches S_A2, S_A3 are switched to be conductive, the resistor block 162 in the resistor cell 121A1_1 acts with a total resistance value of 4 kOhm.

The third resistor block 163 has four resistors R_A4 to R_A7 in four series circuits connected in parallel. Thus, block 163 has a series circuit consisting of a fourth switch S_A4 and a fourth resistor R_A4 up to a series circuit consisting of a seventh switch S_A7 and a seventh resistor R_A7. When the fourth to seventh switches S_A4 to S_A7 are switched to be conductive, the resistor block 163 in the resistor cell 121A1_1 acts with a total resistance value of 2 kOhm.

The fourth resistor block 164 has eight resistors R_A8 to R_A16 in eight series circuits connected in parallel. Thus, block 164 has a series circuit consisting of an eighth switch S_A8 and an eighth resistor R_A8 up to a series circuit consisting of a sixteenth switch S_A16 and a sixteenth resistor R_A16. When the eighth to sixteenth switches S_A8 to S_A16 are conductive, the resistor block 164 in the resistor cell 121A1_1 acts with a total resistance value of 1 kOhm.

For the sake of clarity, not all resistors of the resistors R_A1 to R_A16 and switches of the switches S_A1 to S16 are provided with a reference sign in FIG. 12.

The control unit 153A has four D flip-flops 3A1, 3A2, 3A3, 3A4. One of the bits N_A_1<0:3> of a binary number is connected to the input D of each of the flip-flops 3A1, 3A2, 3A3, 3A4. For the first D flip-flop 3A1 in FIG. 12, the corresponding one bit of the binary number N_A_1<0:3> is designated as A_1_0. For the second D flip-flop 3A2 in FIG. 12, the corresponding one bit of the binary number N_A_1<0:3> is designated as A_1_1. For the third D flip-flop 3A3 in FIG. 12, the corresponding one bit of the binary number N_A_1<0:3> is designated as A_1_2. For the fourth D flip-flop 3A4 in FIG. 12, the corresponding one bit of the binary number N_A_1<0:3> is designated as A_1_3.

The binary number was selected from the memory block 154 by the signal generation unit 1512 in FIG. 10 via the selection signal S_SL. The bits N_A 1<0:3> of the binary number, i.e. the signals A_1_0, A_1_1, A_1_2, A_1_3, control which of the switches of the four resistor arrays 161 to 164 should be conductive after completing the step, i.e. in this case step S1. For this purpose, an output $\overline{Q}$ of the first D flip-flop 3A1 acts on the switch S_A1 of the first resistor block 161. An output $\overline{Q}$ of the second D-flip-flop 3A2 acts on the switches S_A2, S_A3 of the second resistor block 162. An output $\overline{Q}$ of the third D-flip-flop 3A3 acts on the switches S_A4 to S_A7 of the third resistor block 163. An output $\overline{Q}$ of the fourth D flip-flop 3A4 acts on the switches S_A8 to S_A16 of the fourth resistor block 164.

At the input C of each of the four D flip-flops 3A1, 3A2, 3A3, 3A4 there is a step signal or signal for step S1 as an example.

As soon as a rising edge in the signal for step S1 arrives at the input C of one of the D flip-flops 3A1, 3A2, 3A3, 3A4, the value of the signal at the input D is applied to the inverting output $\overline{Q}$ because the switches S_A1 to S_A16 in the example shown are designed as PMOS transistors.

However, if the switches S_A1 to S_A16 are designed as NMOS transistors, as in the parallel circuits 121B1, 121D1, the output Q is used instead of the output $\overline{Q}$ to control the switches S_A1 to S16.

This allows at least one of the resistor blocks 161, 162, 163, 164 to be switched on.

The same control is carried out, in particular simultaneously, for the resistor blocks 161, 162, 163, 164 of the resistor cells of the parallel circuits 121B1, 121C1, 121D1. In addition, such control is subsequently carried out for the at least one next step S_X for the resistor blocks 161, 162, 163, 164 of the resistor cells of the parallel circuits 121A1, 121B1, 121C1, 121D1.

When the entire transition is completed, depending on the values controlled and then set by the control part 15, each resistor cell 121A1_1 of the parallel circuit 121A1 can have one of 16 equivalent resistance values between infinity, where all switches S1 to S16 are open, and a resistance value of about 533 ohms, where all switches S1 to S16 are closed. Thus, each resistor array or parallel circuit 121A1 can have a possible equivalent resistance value between infinity, where all switches S1 to S16 are open, and a resistance value of about 18 ohms, where all switches S1 to S16 are closed. The same applies to the parallel circuits 121B1, 121C1, 121D1 and their resistor cells 121A1.

This allows easy adaptations in order to perform calibrations for individual parts as well as for the development of transmitting modules 121 for standards other than those applicable to a CAN bus system. In particular, the transmitting module 121 can represent or generate all static states permitted in CAN-XL and/or 10Base-T1S, including their intermediate states. The intermediate states can also be called transition states.

By bundling the individual resistance fingers or resistor elements S_A1, R_A1 etc. into the resistor blocks 161, 162, 163, 164 with the binary coding, there are, with this solution, only 30*4=120 control lines from the logic block 153 to the H-bridge of the transmitting module 121 per array for 450 individual resistance fingers. The transmitting module 121 guarantees that no more resistance fingers or resistor elements S_A1, R_A1, etc. than necessary are switched at the same time.

This makes it possible to avoid large switching peaks which occur if, for example, the 450 resistance fingers or resistor elements S_A1, R_A1, etc. of a transmitting module 121 were to be controlled directly in binary with 9 lines, such as in a transition from 255 to 256 (binary: 011111111 to 100000000). In such a transition from 255 to 256 (binary: 011111111 to 100000000), conductive fingers would switch each individual line.

A further advantage is that even in the event of unforeseen incomplete transitions, no abrupt changes to the output of the transmitting module 121 are possible. The reason for this is that even after resetting the chain, the changes again only happen or take place step by step. This ensures a continuous output and is therefore good for the emission behavior of the transmitting module 121 and the associated transmitting/receiving device 12.

The circuit implementation of the logic block 153 shown in FIG. 12, which controls a logic function N(X, transition), where N=(N_A, N_B, N_C, N_D) is the vector of active resistance fingers which should be active at step S_X of a selected transition, is only one possible implementation of the logic block 153.

In general, 40 logic functions N(X, transition) can be implemented for all transitions on the bus. The implementations of the different transitions may vary.

In addition, although the circuit implementation of the logic block 153 shown in FIG. 12 is technically simple and robust, it allows only limited large steps or intermediate states for the transition.

The logic block 153 and/or the control of the switches for the resistors of the transmission stages 121A, 121B, 121C, 121D can therefore allow a different design of the steps or intermediate states than shown in FIG. 11 or described above in Tables 2 and 3. In particular, the logic block 153 and/or the control of the switches for the resistors of the transmission stages 121A, 121B, 121C, 121D can make the size of the steps and/or the duration of the intermediate states more flexible.

All above-described embodiments of the transmitting module 121 of the transmitting/receiving device 12, of the subscriber stations 10, 20, 30, of the bus system 1 and of the method carried out therein according to the exemplary embodiment and its modifications can be used individually or in all possible combinations. Additionally, the following modifications are possible in particular.

The above-described bus system 1 is described on the basis of a bus system based on the CAN protocol. However, the bus system 1 according to the exemplary embodiment may alternatively be another type of communication network in which the signals are transmitted as differential signals.

It is advantageous, but not necessarily a prerequisite, for exclusive, collision-free access of a subscriber station 10, 20, 30 to the bus 40 to be ensured in the bus system 1, at least for certain time periods.

The bus system 1 according to the exemplary embodiment and its modifications is in particular a bus system in which communication can take place between at least two of the subscriber stations 10, 20, 30 according to two different CAN standards, such as CAN-HS or CAN FD or CAN SiC or CAN XL. The functionality of the above-described exemplary embodiment can thus be used, for example, in transmitting/receiving devices 12, 22 that are to be operated in such a bus system.

The number and arrangement of the subscriber stations 10, 20, 30 in the bus system 1 according to the exemplary embodiment and its modifications can be selected arbitrarily.

What is claimed is:

1. A transmitting module for a transmitting/receiving device of a subscriber station of a serial bus system, in which the transmitting module is configured to transmit a digital transmit signal as an analog differential signal to a bus of the bus system to transmit a message to at least one other subscriber station of the bus system, the transmitting module comprising:

transmission stages with parallel circuits including switchable resistors; and a control part configured for step-by-step control of switching of the switchable resistors;

wherein at least two of the switchable resistors are arranged so as to be switchable together in a resistor block, wherein at least two resistor blocks are provided which have at least one of the switchable resistors; and wherein the control part is configured to generate bus states predetermined by the digital transmit signal over time on the bus by step-by-step changing a number of actively switched resistor blocks over time.

2. The transmitting module according to claim 1, wherein all of the switchable resistors have approximately the same resistance value.

3. The transmitting module according to claim 1, wherein a resistance value of a first resistor block of the at least two resistor blocks is approximately half as large as a resistance value of a second resistor block of the at least two resistor blocks.

4. The transmitting module according to claim 1, further comprising a state processing block configured to evaluate the digital transmit signal in order to decide how the switchable resistors of the parallel circuits are to be switched step by step in order to set a desired state on the bus.

5. The transmitting module according to claim 4,
wherein the state processing block is configured to generate a slew rate signal, and
wherein the state processing block is configured to generate the slew rate signal based on an evaluation result of the digital transmit signal.

6. The transmitting module according to claim 5,
wherein the state processing block is configured to generate a step start signal, and
wherein the state processing block is configured to output the slew rate signal after release by a step start signal for controlling the switchable resistors.

7. The transmitting module according to claim 1, further comprising a step generator configured to generate a step signal based on a slew rate signal and to output the step signal to a logic block for controlling switches of the parallel circuit for switching the switchable resistors.

8. The transmitting module according to claim 7, wherein the state processing block is configured to generate a reset signal for resetting the step generator to an initial value.

9. The transmitting module according to claim 1, further comprising a logic block configured to generate a control signal for controlling the at least two resistor blocks of a transmission stage.

10. The transmitting module according to claim 9,
wherein the logic block has at least two flip-flops arranged to generate a control signal for each of the at least two resistor blocks, and
wherein the logic block is configured to generate the control signal as a binary number having bits, a number of which is equal to a number of the at least two flip-flops and to output the bits to the at least two flip-flops.

11. The transmitting module according to claim 9, further comprising:
a memory block in which setpoint values for the resistance values of the parallel circuits are stored, wherein the setpoint values are to be generated for transitions between signal states on the bus for each intermediate state in the transition,
wherein the state processing block is configured to generate, based on an evaluation of the digital transmit signal, a selection signal and to output the selection signal to the logic block, and
wherein the logic block is configured to generate the control signal for controlling the at least two resistor blocks of a transmission stage based on transitions selected by the selection signal.

12. The transmitting module according to claim 9,
wherein the transmitting module, for generating each intermediate state on the bus, has a resistor cell in which resistor blocks are arranged,
wherein the logic block, for controlling each intermediate state on the bus, has a control cell which is configured to control one of the resistor cells, and
wherein all control cells are constructed identically for each intermediate state.

13. The transmitting module according to claim 1, wherein a first through a fourth transmission stage of the transmission stages are connected in a full bridge, in which the first and the fourth transmission stages are connected in series and a third and a second transmission stages are connected in series.

14. The transmitting module according to claim 13,
wherein the first through the fourth transmission stages are configured to generate differential bus signals for a bus of the bus system in response to two different values of the digital transmit signal such that the transmitting module generates, in a first operating mode, a first or second bus state on the bus and generates, in a second operating mode, a third or fourth bus state, and
wherein the bus signals on the bus form a differential voltage of which a voltage value is different for the first through fourth bus states.

15. A transmitting/receiving device for a subscriber station of a serial bus system, comprising:
a transmitting module configured to transmit a digital transmit signal as an analog differential signal to a bus of the bus system to transmit a message to at least one other subscriber station of the bus system, the transmitting module including:
transmission stages with parallel circuits including switchable resistors, and
a control part configured for step-by-step control of switching of the switchable resistors;
wherein at least two of the switchable resistors are arranged so as to be switchable together in a resistor block,
wherein at least two resistor blocks are provided which have at least one of the switchable resistors, and
wherein the control part is configured to generate bus states predetermined by the digital transmit signal over time on the bus by step-by-step changing a number of actively switched resistor blocks over time; and
a receiving module configured to receive signals from the bus and to generate a digital reception signal from the analog differential signal.

16. The transmitting/receiving device according to claim 15, wherein the transmitting module is configured to generate the analog differential signals in a first communication phase of the message with a different physical layer than in a second communication phase.

17. A subscriber station for a serial bus system, comprising:
a transmitting/receiving device, including:
a transmitting module configured to transmit a digital transmit signal as an analog differential signal to a bus of the bus system to transmit a message to at least one other subscriber station of the bus system, the transmitting module including:
transmission stages with parallel circuits including switchable resistors, and
a control part configured for step-by-step control of switching of the switchable resistors;
wherein at least two of the switchable resistors are arranged so as to be switchable together in a resistor block,
wherein at least two resistor blocks are provided which have at least one of the switchable resistors, and
wherein the control part is configured to generate bus states predetermined by the digital transmit signal over time on the bus by step-by-step changing a number of actively switched resistor blocks over time, and a receiving module configured to receive signals from the bus and to generate a digital reception signal from the analog differential signal, and a communication control device configured to control communication in the bus system and to generate a first transmit signal;

wherein the subscriber station is configured for communication in a bus system in which an exclusive, collision-free access of a subscriber station to a bus of the bus system is guaranteed at least temporarily.

18. A method for transmitting a message with differential signals in a serial bus system, wherein the method is carried out using a transmitting module which has transmission stages with parallel circuits including of switchable resistors and is configured to transmit a digital transmit signal as an analog differential signal to a bus of the bus system to transmit a message to at least one other subscriber station of the bus system, the method comprising:

controlling, step-by-step, switching of the switchable resistors with using a control part of the transmitting module, wherein at least two of the switchable resistors are arranged so as to be switchable together in a resistor block, wherein at least two resistor blocks are provided which have at least one of the switchable resistors, and wherein the control part generates bus states predetermined by the digital transmit signal over time on the bus by step-by-step changing a number of actively switched resistor blocks over time.

* * * * *